United States Patent
Karnam Holal et al.

(10) Patent No.: US 8,660,590 B2
(45) Date of Patent: Feb. 25, 2014

(54) UNIFIED VIEW OF SHORT MESSAGE SERVICE (SMS) INTERACTION HISTORY WITH OTHER CHANNEL MESSAGES BASED ON CASE IDENTIFIER IN A CUSTOMER RELATIONSHIP MANAGEMENT (CRM) APPLICATION

(75) Inventors: Sujai Karnam Holal, Sadashivanagar Bangalore (IN); Chandrani Choudhuri, Sadashivanagar Bangalore (IN); Amit Narasimha Kamath, Sadashivanagar Bangalore (IN); Mahesh Kumar Sahu, Sadashivanagar Bangalore (IN)

(73) Assignee: Talisma Corporation Private Ltd. (IN)

( * ) Notice: Subject to any disclaimer, the term of this patent is extended or adjusted under 35 U.S.C. 154(b) by 122 days.

(21) Appl. No.: 13/059,008

(22) PCT Filed: Aug. 13, 2009

(86) PCT No.: PCT/IB2009/053581
§ 371 (c)(1), (2), (4) Date: May 4, 2011

(87) PCT Pub. No.: WO2010/018556
PCT Pub. Date: Feb. 18, 2010

(65) Prior Publication Data
US 2011/0207484 A1    Aug. 25, 2011

(30) Foreign Application Priority Data
Aug. 14, 2008   (IN) .......................... 1978/CHE/2008

(51) Int. Cl.
*H04W 4/00*    (2009.01)

(52) U.S. Cl.
USPC ..................... 455/466; 455/412.1; 455/414.1

(58) Field of Classification Search
USPC ............... 455/466, 412.1, 414.1; 705/333, 28
See application file for complete search history.

(56) References Cited

U.S. PATENT DOCUMENTS

| | | | |
|---|---|---|---|
| 2003/0114174 A1* | 6/2003 | Walsh et al. | 455/466 |
| 2004/0137884 A1* | 7/2004 | Engstrom et al. | 455/414.1 |
| 2006/0059033 A1* | 3/2006 | Wagner et al. | 705/10 |
| 2006/0155715 A1* | 7/2006 | Duffek et al. | 707/100 |
| 2008/0033880 A1* | 2/2008 | Fiebiger et al. | 705/44 |

\* cited by examiner

*Primary Examiner* — Lester Kincaid
*Assistant Examiner* — Mehmood B Khan
(74) *Attorney, Agent, or Firm* — Steven M. Greenberg, Esq.; CRGO Law

(57) ABSTRACT

A method to provide a unified and integrated view of the SMS Interaction history with other channel messages (irrespective of the Interaction channel) based on Case ID (Case Identifier) in a CRM application. The method parses the incoming SMS message text for the Case Identifier. The Interaction Thread belonging to the same Case ID is retrieved from the CRM application database and the incoming SMS message is added to that Interaction Thread. The whole interaction history pertaining to the same Case ID is displayed on the CRM application user interface at one place along with latest received massage via SMS along with various other channels of communication in order to enable proper management of the customer interaction. In case there is no Interaction Thread having same Case ID, a new Interaction Thread is created and all subsequent messages are threaded to the new Interaction Thread.

10 Claims, 5 Drawing Sheets

UNIFIED VIEW OF SHORT MESSAGE SERVICE (SMS) INTERACTION HISTORY WITH OTHER CHANNEL MESSAGES BASED ON CASE IDENTIFIER IN A CUSTOMER RELATIONSHIP MANAGEMENT (CRM) APPLICATION

CROSS-REFERENCE TO RELATED APPLICATIONS

This application is a Submission Under 35 U.S.C. §371 for U.S. National Stage Patent Application of International Application Number PCT/IB2009/053581, filed on Aug. 13, 2009, and entitled UNIFIED VIEW OF SHORT MESSAGE SERVICE (SMS) INTERACTION HISTORY WITH OTHER CHANNEL MESSAGES BASED ON CASE IDENTIFIER IN A CUSTOMER RELATIONSHIP MANAGEMENT (CRM) APPLICATION, which is related to and claims priority to Indian Patent Application Serial Number 1978/CHE/2008, filed Aug. 14, 2008 the entirety of both are incorporated herein by reference.

TECHNICAL FIELD

This invention relates to a method to provide an integrated and unified view of the SMS Interaction history along with other communication channel messages based on Case ID (Case Identifier) in a CRM application.

BACKGROUND ART

Customer Relationship Management (CRM) is a term applied to processes implemented by a company/organization to handle its interactions with its customers. CRM software is used to support these processes such as storing information on current and prospective customers. Information in the system can be accessed and entered by employees in different departments, such as sales, marketing, customer service, training, professional development, performance management, human resource development and compensation. The rationale behind this approach is to improve services provided directly to customers and to use the information in the system for targeted marketing and sales purposes. CRM software reduces operating costs and helps all customer-facing personnel of the company/organization make better and timely decisions. Leading customer-focused companies view every customer interaction as an opportunity to make a new offer, improve retention, increase revenue, build loyalty, or strengthen their brand. Increasing demand and competition as well as advances in mobile technology have fueled important changes in the CRM software industry. CRM software is easy to use, supports a broad array of mobile devices, provides salespeople with up-to-date information about their accounts and contacts, and helps them manage sales opportunities and track sales-related activities.

DISCLOSURE OF INVENTION

Technical Problem

Mobile communication devices are becoming increasingly popular day by day. Initially people primarily used cellular phone for talking to each other but with the advent of new technologies, cellular phones are being used as an effective communication and information exchange medium between a customer and an organization. The Short Message Service (SMS) provided in the cellular phones gives the ability to send and receive text messages using the wireless communication media. CRM applications and wireless mobile devices usually support the threading of customer messages pertaining to particular information exchanged through SMS and various other media. The main drawback of this system is that if a customer responds to a case resolution or a marketing campaign through SMS message via a mobile phone, the CRM application treats that SMS as a new interaction and sends it to SMS inbox instead of displaying SMS message along with interaction history belonging to that case. The CRM user is not able to identify whether the response received was with respect to an issue the customer has reported earlier or it is a new case altogether. In addition, a customer may have interacted with the organization for various other reasons as well. Each such communication is treated as a different case each time it occurs. If the system creates a message as a new SMS interaction, every time all the previous interactions pertaining to the same customer have to be merged manually. Such an effort will be time consuming and error prone, and the method is not truly an automated one. Following this manual process, it takes time to identify a customer's case or interaction history and provide an appropriate solution. Also, if the message is threaded or attached to an inappropriate case or interaction, the incorrect information will ultimately cause the customer to suffer as there will be a delay in responding to the customer's query, or resolving the customer's problem.

There is currently no precise method to provide an integrated and unified view of all the messages exchanged between a customer and a CRM User for a specific case, through various media. For example, if a customer has sent e-mail pertaining to a particular issue, it becomes a case in a CRM application. If the customer further communicates regarding that case using SMS, no application or device currently provides the capability to provide a unified view of all the messages at one place for easy reference.

Technical Solution

The invention meets the above needs and overcomes one or more deficiencies in the present technologies by providing a method to display a unified and integrated view of SMS Interaction history with other channel messages (irrespective of the interaction channel) based on Case ID(Case Identifier) in a CRM application. The facility to thread all the messages related to the same Case ID in a CRM application enables the integration of such messages irrespective of whether the message was exchanged through the SMS medium or any other medium. The customer gets the flexibility to respond using SMS medium and is not limited to using media such as e-Mail, phone, chat, fax etc.

The present invention provides an integrated and unified view of all the interaction history belonging to a customer with same Case ID irrespective of the medium of communication such as e-mail, SMS, Chat, Fax or the like. When a new customer sends a message to the CRM User for the first time via any media, a new Interaction Thread is created, wherein he is assigned a unique Case ID that is sent to him by the CRM User in his reply message. Next time, when the customer again wants to send a message relating to the same subject matter, he is requested to mention the Case ID in his SMS message text. The customer is free to use any communication channel such as e-mail, SMS, Chat, Fax or the like. If the customer wants to reply via SMS, he has to embed the same Case ID assigned to him, in his message text for reference. Whereas, when a CRM User receives a new SMS message from an existing customer, the invented method extracts the Case ID from the message text and displays all the recent interaction history, bearing the same Case ID, from the application database, sent by the same customer, on the CRM application's User Interface. Usually, in a general-purpose database, details of a customer are stored in a database in the form of data fields such as Customer name, Contact number, e-mail ID, Fax number etc. The customer is identified by such application only if he responds via any of these media. In such a case customer is restricted to use only those channels of communication for which his relevant identification details are entered in the company database else he himself has to keep a record of his previous SMS interactions with the company or organization, which is both time consuming and inconvenient. With the help of the invented method, the whole process of identifying the customer when he sends the message via SMS, is eased down to a great extent, as the customer embeds the unique Case ID in all of his SMS message texts which is extracted by the invented method and the interaction history containing all the communication events with same Case ID is displayed on the CRM application's GUI for reference which includes prior SMS messages, e-mails or Chats, Fax etc.

Generally, it is observed that a customer with average intelligence is unable to remember and recall such Case ID that includes letters and numeric characters. Thus while writing the reply messages, the customer does not have to remember whole of the Case ID as such. It is sufficient even if he remembers at least the first few or the last few letters the Case ID assigned to him. For example, if the Case ID assigned to the customer is TL12345 wherein TL denotes the keyword and 12345 is the substring, and chooses to replies via SMS with message text containing TL2345, the stored procedure inside the program module of the invented method returns 12345 as an output. This output is used to identify a Case ID matching with the last numeric characters with the customer records in the application database. Thus, the Customer gets the flexibility of using any media for communication provided he mentions the Case ID. In case, he is new customer who has not been assigned a Case ID previously, the invented method creates a new Case ID which is used in all of his future communications with the company/organization.

Advantageous Effects

The main advantage of the invention is that threading of all the messages pertaining to the same Case, provides the CRM user with an integrated and unified view of all the interactions across various media that a customer or any other individual had with the company/organization. Centralized information improves an organization's productivity and provides faster responses and resolutions to cases. This facility also provides the customers with the power and flexibility to choose the medium in which the customer interacts with the company/organization.

According to one aspect of the present invention a method to provide a unified view of short message service (SMS) interaction history along with other channel messages (irrespective of the interaction channel), based on case identifier in a customer relationship management (CRM) application includes the steps of receiving an incoming SMS message on CRM application, extracting Case ID (Case Identifier) embedded inside the incoming SMS message text, retrieving interaction history having same Case ID from the application database, threading the incoming SMS message to the pre-existing Interaction Thread having same Case ID, displaying the incoming SMS message along with all previously received messages from retrieved interaction history on CRM application user interface.

According to yet another aspect the exemplary embodiment of the invention includes a User Interface, consisting of an Interaction History Penal. The Interaction History Penal displays the messages exchanged (via any of the communication channels such as e-mail, phone, SMS, chat, fax and the like) between a Customer and a CRM User. The messages displayed include both the incoming and outgoing messages sorted by date and time of such exchange.

The prime objective of the invention is to combine, sequence and display a customer's interaction via SMS messages along with various other channels of communication, pertaining to a single case, at one place in order to enable proper management of the customer interaction for serving the community efficiently and flawlessly.

The above explanation is provided to introduce a selection of concepts in a simplified manner that are further described below in detailed description and in no way restricts the scope of the disclosed invention.

DESCRIPTION OF DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings. Example embodiments are illustrated by way of example and not limitation in the figures of the accompanying drawings, in which like references indicate similar elements and in which:

Corresponding reference characters in the detailed description indicate corresponding parts throughout the drawings.

BEST MODE

Embodiments of the present invention provide a method to display a unified view of SMS Interaction history with other channel messages (irrespective of the Interaction channel) based on the Case ID (Case Identifier) in a CRM application. While the invention has been particularly shown and described with reference to an illustrative embodiment, it will be understood by those skilled in the art that various changes in the form and detail may be made therein without departing from the spirit and soul of the invention.

Figure 1:
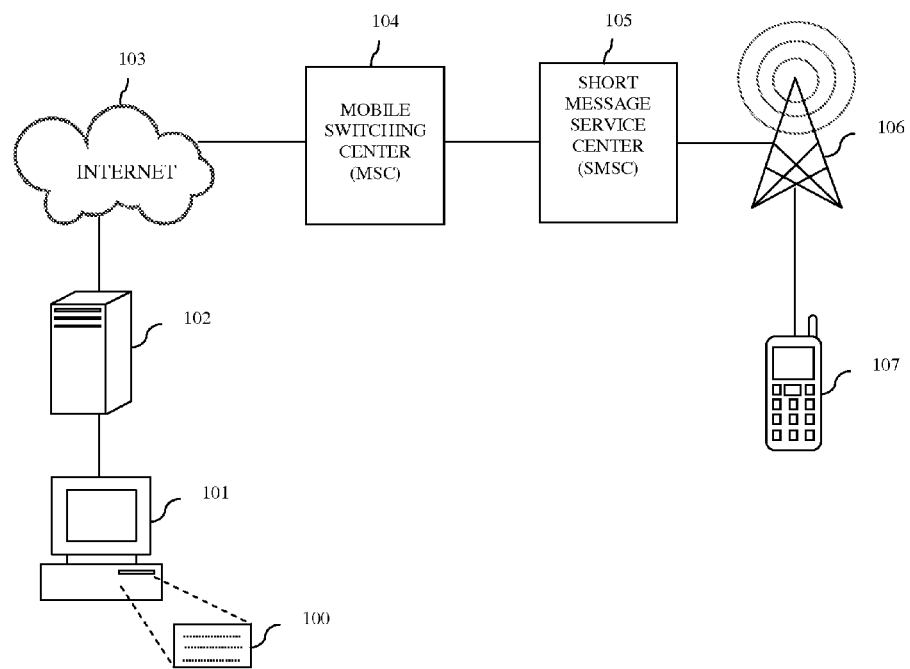
FIG. 1 is a functional block diagram of the operating environment in which SMS messages are exchanged between a computing device and a mobile device.

FIG. 1 is a functional block diagram of the operating environment in which SMS messages are exchanged between a computing device 101 and a mobile device 107. An exemplary mobile device 107 is shown as being in wireless communication with the computing device 101 running the CRM application. Text messages are exchanged between the mobile device 107 and the computing device 101 through the application server 102. The CRM application embodying the present invention is operational with numerous other general purpose or special purpose computing system environments or configurations. Examples of well known computing systems, environments, and/or configurations that may be suitable for implementation or use for the purpose of the invention includes, but not limited to personal computer, desktop or a server computer, laptops which run on any one of the following operating system Windows Server 2003, Windows XP, Windows Vista. For accessing the CRM application over the web, Internet Explorer and Firefox browsers are supported. SMS messages may also be transmitted between the messaging devices that do not include mobile devices. Mobile device network includes a wireless transceiver station 106 that communicates with the mobile device network via wireless link. Short message channel includes a short message service center (SMSC) 105 that is networked to the mobile switching center (MSC) 104. The mobile switching center 104 connects telephone calls by switching the digital voice data packets from one network path to another (also called routing). The mobile switching center 104 also provides the information that is needed to support mobile service subscribers, such as user registration and authentication information etc. Short message service center 105 directs short messages (SMS) between mobile device 107 and text messaging device via computer network according to the present invention. It will be appreciated that mobile switching center 104 and short message service center 105 may be implemented with one or more specialized or general-purpose computer systems. Such systems commonly include a high-speed processing unit (CPU) in conjunction with a memory system (with volatile and/or non-volatile memory), an input device and an output device as is known in the art.

The communication events include telephone calls, both sent and received, SMS messages both sent and received, e-mail correspondences both sent and received and two way chatting and Fax etc. Each such communication generally includes two parties or users at each end. In context of the present invention, one user is referred to as a message-originating user or the Customer who first initiates the communication with a company or an organization via mobile device 107. The Customer may be a potential future customer who makes a product enquiry; an old customer, who wants to register a complaint with respect to some previously purchased product; or a customer who simply wants to make general enquiry. The user on the other end, who is the recipient of the message, is referred to as CRM User who may be a customer service representative generally operating or interacting from the computing device 101. The CRM User receives the messages and responds according to Customer's requirements in order to resolve their queries or problems. The terms, Customer and CRM User are used throughout the detailed description of the invention to enable an easy understanding of the invented method.

The method of identifying the customer includes a method of assigning a unique Case ID to the customer after receiving a communication event from him for the first time. The method further includes starting a new Interaction Thread upon receiving such communication for which there is no corresponding Case ID in the application database. The unique Case ID is attached to the customer communication for future reference and is saved in the application database. The CRM User writes a reply message with Case ID embedded inside the message text and transmits the reply message to the customer. Upon receiving the reply message from the CRM User, the customer chooses to reply via SMS. The SMS message text composed by the customer includes a part or whole of the Case ID prefixed or suffixed to the keyword. The method further includes extracting keyword and substring from the message text in order to extract the Case ID. The method parses the text message for keyword and recognizes the Case ID. The method further includes retrieving and displaying interaction history with date and time, belonging to same Case ID from the application database. The interaction history belonging to same customer bearing the unique Case ID along with the latest SMS message is retrieved from the application database and displayed at one place on CRM application's user interface. The display of information at one place allows CRM User to better contextualize the content of the new message from an old customer and respond in an appropriate manner.

Referring now to the drawings wherein the figures are made for the purpose of illustrating the preferred embodiments of the present invention only, and not for limiting the same.

Figure 2:
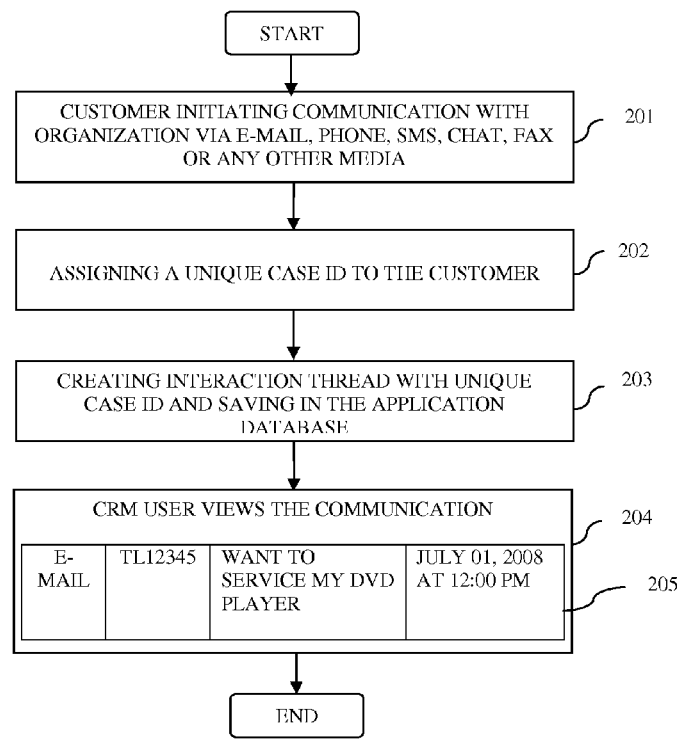
FIG. 2 is a block diagram illustrating one approach of processing the communication when initiated by a customer with the company/organization.

FIG. 2 is a block diagram illustrating one approach of processing the communication when initiated by a customer with the company/organization. At step 201, the Customer sends a message via any of the communication channels such as e-mail, phone, SMS, chat, fax and the like. Upon receiving the new SMS message from the Customer, at step 202, a unique Case ID (Case Identifier) is automatically generated within the CRM application for an interaction. As an example, a Case ID may consist of a combination of letters (hereinafter called as keyword) describing the type of communication (e.g. interaction, campaign, subscription etc), and combination of numeric characters from 1 to 9 (herein after called as substring). For example a Case ID may be TL12345, wherein TL is the keyword and 12345 is the substring. The Case ID is automatically assigned to the customer communication upon receiving a new message from him. Further in step 203, an Interaction Thread is created with the unique Case ID and the communication event is threaded to the Interaction Thread with the date and time stamp. This Interaction Thread is saved in the application database. A new Interaction Thread is created by default when a new customer sends an SMS message to the company/organization for the first time. In case of a pre-established Interaction Thread the messages are threaded to the Interaction Thread bearing the same Case ID. At step 204, the received message 205 is viewed and analyzed by the CRM User to take appropriate action depending upon customer's request or requirements.

Figure 3:
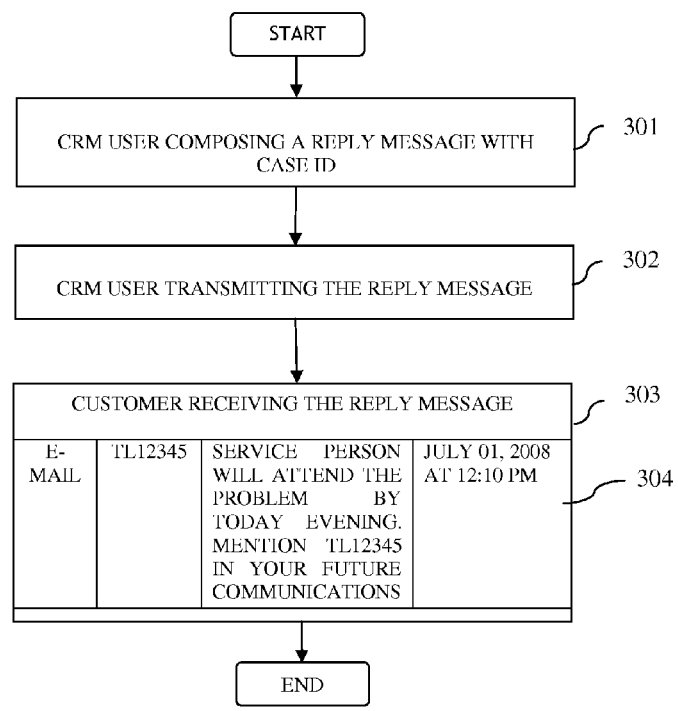
FIG. 3 illustrates further embodiment of the exemplary method wherein the steps performed by the method after receiving message from the customer are described.

FIG. 3 illustrates further embodiment of the exemplary method wherein the steps performed by the method after receiving message from the customer are described. At step 301, in response to customer's message received at step 201 (FIG. 2), a reply message is prepared by the CRM User. The message text contains an associated Case ID that was assigned to the customer in step 202 (FIG. 2). In the next step 302 (FIG. 3), the CRM User transmits the reply message to the customer via any of the communication channels such as e-mail, phone, SMS, chat, fax and the like. During processing of these messages, each message text has an associated Case ID embedded inside it. The date and time of the message therefore may be used to determine the time when the message last changed its status, for example, when it was last sent or received. At step 303 (FIG. 3), the customer receives the reply message sent by the CRM User. The customer is notified that further responses to this interaction should include the Case ID containing the specific keyword and substring assigned to him, along with the SMS content, if the customer chooses to respond through the SMS medium. Step 304 shows the exemplary reply message (as displayed on application User Interface) received by the customer from the CRM User.

Figure 4:
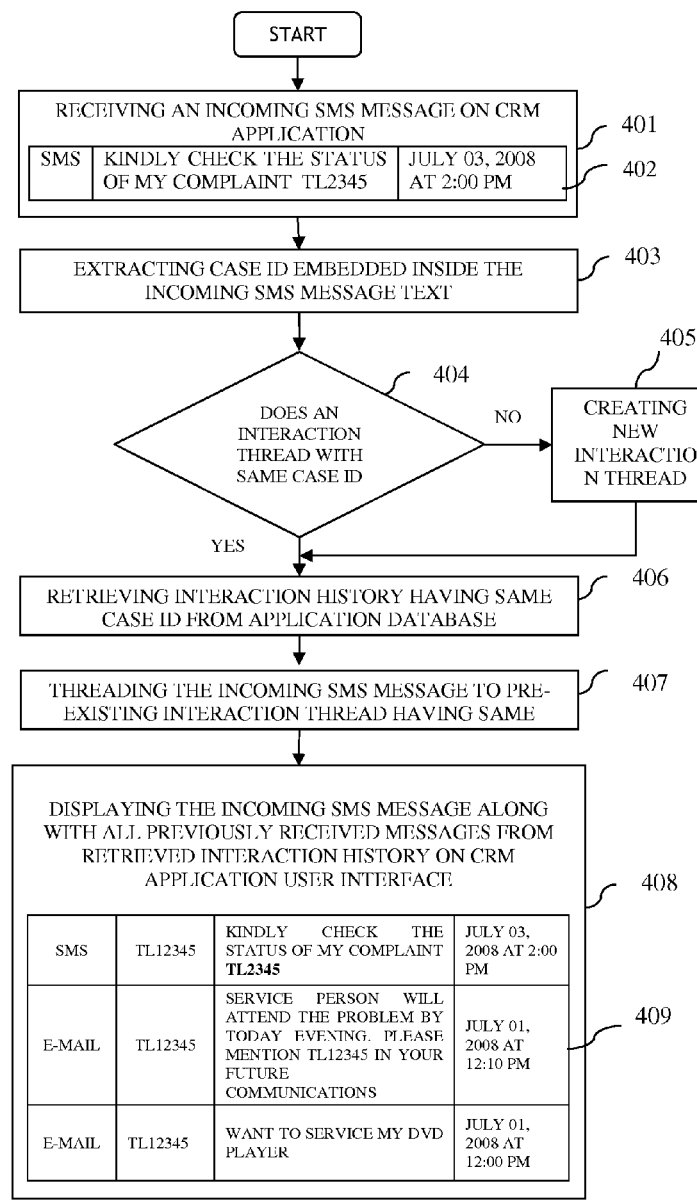
FIG. 4 illustrates an exemplary method of extracting the Case ID from the incoming SMS message text and displaying the interaction history in accordance with one embodiment of the invention.

Referring now to FIG. 4 that illustrates an exemplary method of extracting the Case ID from the incoming SMS message text and displaying the interaction history, in accordance with one embodiment of the invention. At step 401, the Customer transmits a reply SMS message 402 with embedded Case ID to the CRM User. The SMS message text sent by the Customer includes a part or whole of the Case ID prefixed or suffixed with the keyword and inscribed within the message text. For example if the Case ID assigned to the customer is TL12345 and he replies via SMS message with message text containing TL2345, the stored procedure inside the program module of the invented method returns TL12345 as an output. At step 403, upon receiving the reply SMS message, the invented method parses the message and identifies the customer by matching the Case ID with pre-existing Case ID in the application database. At step 404, it is checked whether there is any pre-existing Interaction Thread with same Case ID in the application database. In case there is no pre-existing Interaction Thread, a new Interaction Thread with a unique Case ID is created at step 405. In case an Interaction Thread with same Case ID exists in the application database, the control proceeds to step 406 where the invented method retrieves the interaction history belonging to the same Case ID from the application database. After this the step 407 is followed where the SMS message is threaded to the same Interaction Thread with same Case ID. At step 408, the interaction history belonging to the unique Case ID is displayed on CRM application's user interface irrespective of the medium or channel through which the messages were exchanged. 409 shows an example of the unified view of the interaction history containing messages that have been exchanged over the same Interaction Thread. The interaction history panel 409 of the CRM application User Interface displays text messages from the Interaction Thread pertaining to the unique Case ID belonging to the Customer. The interaction history panel 409 consists of a set of text messages exchanged between the customer and the CRM User and includes both the incoming and outgoing messages. Preferably, the interaction history panel 409 displays messages or interactions sorted by date and time of receiving or sending them. In the illustrated example the most recent messages are displayed closer to the top of the interaction history penal 409 while older messages are displayed closer to the bottom of the panel. In order to access details of any individual message in the Interaction Thread, the message is selected from the interaction history panel 409. When a saved message is selected from the interaction history, the whole of the text included within the message is displayed and the message is treated as any other text message belonging to the thread for the purpose of history collecting, grouping and displaying. As shown in example, the messages displayed on the interaction history panel 409 contains all the details of the messages such as mode through which messages were exchanged e.g. via e-mail, SMS etc. Case ID of the customer, text of the messages and date and time of receiving or sending the messages is also displayed likewise.

In accordance with the practices of the persons skilled in the art of computer programming, the present invention is described with reference to acts and symbolic representations of operations that are performed by such computer systems, unless indicated otherwise. Such acts and operations are sometime referred to as being computer executed and may be associated with the operating system or application program as appropriate. Those skilled in the art will appreciate that the steps shown in the flow diagram in FIG. 2, FIG. 3 and FIG. 4 may be altered in a variety of ways. For example, the order of steps may be altered; sub steps may be performed in parallel; shown steps may be deleted or some new steps may be included as per the requirement of the system on which it is implemented.

Figure 5:
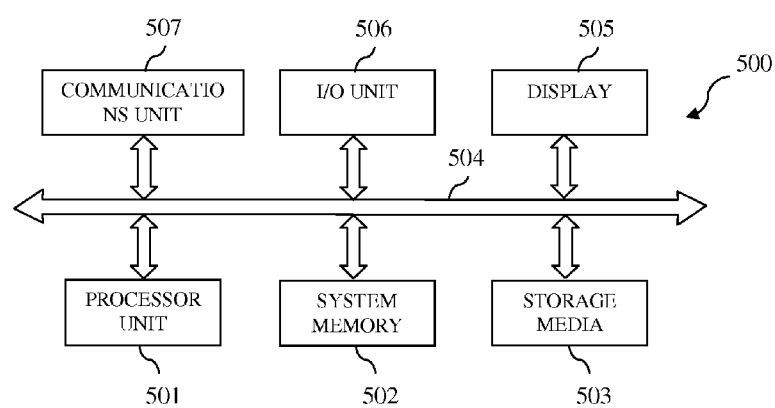
FIG. 5 is a block diagram illustrating an example of suitable computing system environment in which the invented method may be implemented.

The invention can be implemented in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment FIG. 5 is a block diagram illustrating an example of suitable computing system environment in which the invented method may be implemented. The computing system environment is only one example of a suitable computing environment and is not intended to suggest any limitation as to the scope of use or functionality of the invention. Neither should the computing system environment be interpreted as having any dependency or requirement relating to any one nor a combination of components illustrated in the exemplary operating environment. Computer Environment includes a general-purpose computing device in the form of a Data Processing System 500, which may be any of computing devices. While the present invention is described hereinafter with particular reference to the system block diagram of FIG. 5 it is to be understood at the outset of the description which follows, it is contemplated that the apparatus and methods in accordance with the present invention may be used with other hardware configurations as well. For example, the system processor could be an Intel Pentium IV at the Server side and Pentium III at the Client's side.

The exemplary CRM application is operational with numerous other general purpose or special purpose computing system environments or configurations. Examples of well known computing systems, environments, and/or configurations that may be suitable for implementation or use include, but are not limited to personal computer, desktop or a server computer, laptops which run on any one of the following operating system Windows Server 2003, Windows XP, Windows Vista. For accessing the CRM application over the web Internet Explorer and Firefox browsers are supported.

Turning now to FIG. 5, a diagram of a design system is depicted in accordance with an illustrative embodiment. In this illustrative example, Data Processing System 500 includes Communications Fabric 504, provides communications between Processor Unit 501, System Memory 502, Storage Media 503, Communications Unit 507, I/O unit 506, and display 505. Processor Unit 501 serves to execute instructions for software that may be loaded into System Memory 502. Processor unit 501 may be a set of one or more processors or may be a multi-processor core, depending on the particular implementation. The Processing Unit 501 sends various data values, instructions, and information to all the devices and components inside Data Processing System 500 as well as the different peripherals and devices attached.

The System Memory 502 is the place where the computer holds current programs and data that are in use. The System Memory 502 can be divided into two essential types: RAM and ROM. RAM, or Random Access Memory is 'volatile' which means that it only holds data while power is present. RAM changes constantly as the system operate, providing the storage for all data required by the operating system and software. ROM or Read Only Memory is always found on motherboards, but is increasingly found on graphics cards and some other expansion cards and peripherals. Instructions for the operating system, the object-oriented programming system, and applications or programs are located on Storage Media 503. These instructions may be loaded into System Memory 502 for execution by Processor Unit 501. The processes of the different embodiments may be performed by Processor Unit 501 using computer implemented instructions, which may be located in the System Memory 502.

Similarly in network environment, program modules depicted relative to Data Processing System 500, or portions thereof, may be stored in a Remote Memory Storage Devices. Various modules and techniques may be described herein in the general context of computer-executable instructions, such as program modules, executed by one or more computers or other devices. An implementation of these modules and techniques may be stored on or transmitted across some form of computer readable media. Storage Media 503 may include removable/non-removable, volatile/non-volatile computer storage media depending upon the particular implementation. For example, Storage Media 503 may be, a hard drive for reading from and writing to a non-removable, non-volatile magnetic media (not shown), magnetic disk drive for reading from and writing to removable, non-volatile magnetic disk (e.g. 'floppy disk') and optical disk drive for reading from and/or writing to a removable, non-volatile optical disk drive such as CD-ROM, DVD-ROM, a flash memory, or some combination of the above. The hard disk drive, magnetic disk drive and optical disk drive are each connected to the system bus through one or more data media interface.

Communications Unit 507, in these examples, provides for communications with other data processing systems or devices. In these examples, Communications Unit 507 is a network interface card. I/O Unit 506 allows for input and output of data with other devices that may be connected to Data Processing System 500. For example, I/O Unit 506 may provide a connection for user input though a keyboard and mouse. Further, I/O Unit 506 may send output to a printer. Display 505 provides a mechanism to display information to a user. Data Processing System 500 can be connected to other remote computing devices via network connections constituting a computer network. Remote computing device for example can be a desktop or a server computer, laptops. Remote computing device may include many or all of the elements and features described herein relative to Data Processing System 500. Alternatively, Data Processing System 500 can operate in a non-networked environment as well. Networks connections between the Data Processing System 500 and remote computers may be a local area network (LAN) and a wide area network (WAN). A LAN covers a small geographic area, like a home, office, or building whereas a WAN covers a relatively broad geographic area (i.e. one city to another and one country to another country).

In a LAN environment, Data Processing System 500 is connected to local network of computers via network adapter. When implemented in a WAN network environment, Data Processing System 500 includes modem or other means for establishing communications over network. Modem can be internal or external to computer; can be connected to system bus via I/O Unit 506 or other appropriate mechanisms. In some illustrative examples, the Data Processing System 500 may be a Personal Digital Assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main System Memory 502 or cache memory. A Processing Unit may include one or more processors or CPUs. The depicted examples in FIG. 5 and above-described examples are not meant to imply architectural limitations. For example, Data Processing System 500 also may be a tablet computer, laptop computer, or mobile device in addition to taking the form of a PDA. In operation, Data Processing System 500 executes computer executable instructions such as those illustrated in FIG. 2, FIG. 3 and FIG. 4. The order of execution or performance of the methods illustrated and described herein is not essential, unless otherwise specified. That is, elements of the methods may be performed in any order and that the methods may include more or less elements than those disclosed herein. FIG. 5 is intended as an example, and not as an architectural limitation for different embodiments. The hardware in FIG. 5 may vary depending on the implementation. In addition, the processes of the illustrative embodiments may be applied to a multi-processor data processing system.

In view of the many possible embodiments to which the principles of this invention may be applied, it should be recognized that the detailed embodiments are illustrative only and should not be taken as limiting the scope of invention, rather the invention extends to all functionally equivalent structures, methods, and uses that are within the scope of the apprehended claims.

Industrial Applicability

The main advantage of the invention is that threading the exchange of all messages pertaining to a single Case ID provides the CRM User with an integrated and unified view of all the interactions across various media that a customer or any other individual had with the company/organization, pertaining to the same case in the same user interface. The ability to thread all messages related to a Case ID in a CRM application enables the integration of all such messages irrespective of whether the message was exchanged through the SMS medium, or any other medium. Centralized information instantly improves a company's productivity and provides faster responses and resolutions to cases. Another advantage of the invented method is that it provides the customers with the flexibility to respond using SMS medium and is not restricted to use only the commonly used media for replying, such as e-Mail, phone, chat, fax etc.

The invention claimed is:

1. A method to provide a unified view of short message service (SMS) interaction history in a customer relationship management (CRM) application, the method comprising the steps of:

receiving an incoming SMS message in a CRM application;

extracting a Case ID embedded inside said incoming SMS message;

locating a pre-existing interaction thread of SMS messages responsive to one another in a database for the CRM application, the pre-existing interaction thread being associated with the extracted Case ID;

retrieving the located interaction thread from the database;

threading said incoming SMS message into the located interaction thread; and, displaying said located interaction thread with the threaded incoming SMS message in an interaction history panel of the CRM application.

2. The method as in claim 1 wherein said incoming SMS message includes a unique Case ID embedded inside said message text.

3. The method of claim 1 wherein said Case ID comprises: a keyword comprised of one or more letters and; a substring comprised of one or more numeric characters.

4. The method as in claim 3 wherein the step of extracting a Case ID includes the following steps:

searching for said keyword and said substring inside said incoming SMS message text;

matching said keyword and said substring with a corresponding keyword and substring in a pre-existing Case ID associated with saved messages in said database;

resolving an exact Case ID from said matched keyword and said substring.

5. The method as in claim 1 wherein said interaction thread comprises both incoming and also outgoing messages exchanged via at least one of a plurality of communication channels selected from the group consisting of e-mail communication, telephony based voice communication, internet based chat communication, and telephone line based fax.

6. The method as in claim 1 wherein a new interaction thread is created upon receiving a new SMS message responsive to no matching Case ID being found in the step of extracting the Case ID.

7. The method as in claim 1 wherein all subsequent incoming SMS messages with a same Case ID are threaded to said pre-existing interaction thread.

8. The method as in claim 1 wherein said interaction history panel comprises:

all saved messages received or sent via e-mail communication, telephony based voice communication, internet based chat communication, or telephone line based fax;

a Case ID associated with said saved messages;

a communication channel through which the saved messages had been exchanged;

a date and time of receiving or sending said saved messages with said messages being sorted by date and time of receiving or sending.

9. The method as in claim 1 wherein the method further comprises the steps of:

saving incoming SMS messages to the database with a Case ID attached to each of said SMS messages; and, upon request of a user, retrieving said SMS messages from said application database and displaying the SMS messages on a user interface of said CRM application.

10. The method as in claim 9 further includes updating said CRM database to reflect latest messages received or sent through said CRM application.

\* \* \* \* \*